United States Patent [19]
Ziedonis

[11] 3,847,016
[45] Nov. 12, 1974

[54] ULTRASONIC TRANSDUCER ASSEMBLY

[75] Inventor: Janis Gunars Ziedonis, Cranbury, N.J.

[73] Assignee: Hoffmann-La Roche Inc., Nutley, N.J.

[22] Filed: Dec. 8, 1971

[21] Appl. No.: 206,012

[52] U.S. Cl. .............. 73/71.5 U, 73/67.7, 128/2 V, 128/2.05 Z
[51] Int. Cl. ..................... G01n 29/00, A61b 10/00
[58] Field of Search ........... 73/67.7, 71.5; 128/2 V, 128/2.05 P.2.05 Z

[56] References Cited
UNITED STATES PATENTS

| | | | |
|---|---|---|---|
| 3,140,600 | 7/1964 | Howry | 73/67.7 |
| 3,387,604 | 6/1968 | Erikson | 73/71.5 |
| 3,587,561 | 6/1971 | Ziedonis | 128/2.05 Z |
| 3,616,682 | 11/1971 | Golis et al | 73/71.5 |

Primary Examiner—Richard C. Queisser
Assistant Examiner—Stephen A. Kreitman
Attorney, Agent, or Firm—Samuel L. Welt; Bernard S. Leon; Mark L. Hopkins

[57] ABSTRACT

An ultrasonic transducer assembly for patient monitoring use, having an essentially clover-leaf like design with independent flexible arms for conforming to the body curvature. An ultrasonic receiver means is centrally located and ultrasonic transmitters are positioned at the outer portion of each arm to ultrasonically illuminate overlapping areas. The assembly is particularly useful for fetal monitoring.

10 Claims, 3 Drawing Figures

ULTRASONIC TRANSDUCER ASSEMBLY

BACKGROUND OF THE INVENTION

The present invention relates generally to transducer assemblies and more specifically to an ultrasonic transducer assembly for monitoring targets within a body.

In ultrasonic exploratory systems for biological investigations, several types of search units have been made available. Most of these units are of a type which is manually held against the body, is bulky in construction and does not readily accommodate for the body curvature. In this patient monitoring field, parameters are dictated which indicate the desirability for quick and convenient placement of transducer devices that would serve to provide for accurate and reliable data, and simultaneously be of simple design and versatile in application. However, most transducers are critical in placement and are, therefore, less than ideal for monitoring where a large area of illumination is desirable.

One particular area in the field of ultrasonics for which little exists or has been developed in the form of ultrasonic transducer devices, is that relating to fetal heart monitoring. In this particular field, it has been found difficult to track the fetal heart for long periods of time without relocating the transducer, to accommodate the wide divergence of fetal heart positions and depths encountered in long term fetal heart monitoring. In order to operate without transducer placement criticality, large area coverage with fairly uniform sensitivity is highly desirable.

SUMMARY OF THE INVENTION

The purpose of the present invention is to provide an ultrasonic transducer assembly of the type for assuring reliable long term monitoring such as fetal heart monitoring over a wide range of fetal positions within the maternal abdomen. To attain this, the present invention contemplates an ultrasonic multiple element transducer assembly having a central receiving transducer and at least three peripheral transmitting transducers, each of the latter attached to a separate arm extending out from the center body of the assembly where the receiving transducer is located. Each of the arms are designed to be independently flexible of the other arms, and the distances between the centers of each of the adjacent transmitting transducers and to the center of the receiving transducer are such, in conjunction with the lenses provided for proper beam spreading, as to provide a three-dimensional coverage of a maternal abdomen anywhere from 5 cm below the abdomenal surface inward.

DESCRIPTION OF THE PREFERRED EMBODIMENT

Figure 1:
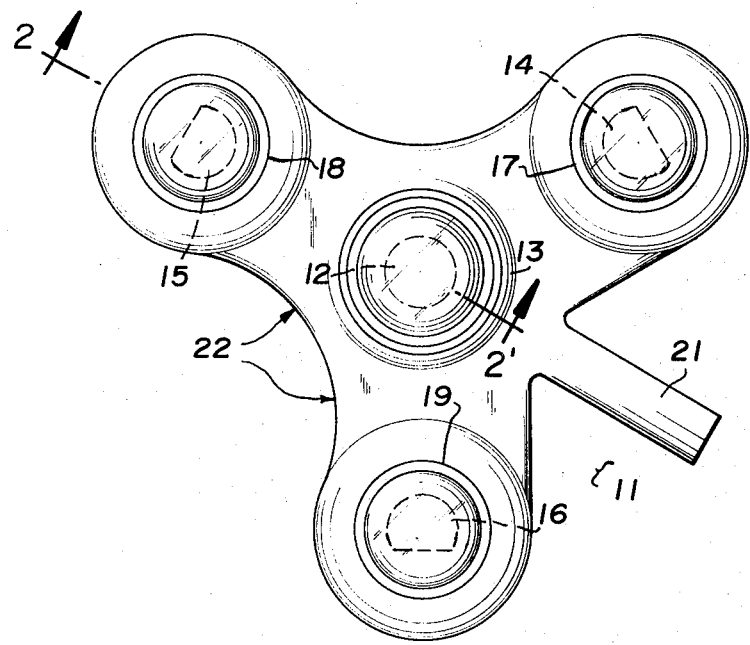
FIG. 1 is a plan view of the transducer assembly illustrating the geometrical setting of the multiple transducer elements.

With reference to the figures, there is shown in FIG. 1 a preferred embodiment of the invention comprising a four element transducer assembly having a body 11, a receiving crystal 12 and receiving lens 13, and transmitting crystals 14, 15 and 16 with transmitting lenses 17, 18 and 19 respectively. A cable 21 supplies power to the respective transmitting crystals and is used for routing the returned signals received by receiving crystal 12, to suitable electrical monitoring instrumentation.

Figure 2:
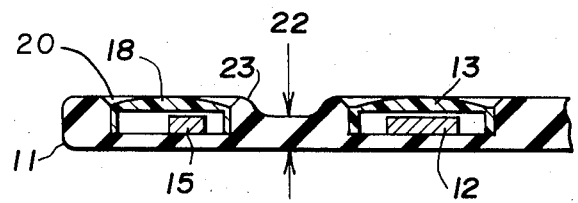
FIG. 2 is a sectional view, taken along line 2—2 of FIG. 1.

The general configuration of the assembly as illustrated is of cloverleaf design having the body 11 fabricated of flexible material such as, for example, a polyurethane or other suitable material which also has high damping characteristics to minimize ultrasonic energy cross-coupling characteristics between crystals. The three arm extensions house the transmitting crystals 14, 15 and 16 at their extremities. As is depicted, each of the arms is wider at its outer end where the crystal is mounted, as opposed to the neck portion 22 intermediate the center of the assembly and the outer ends. In the present embodiment the difference in these dimensions is approximately 20%, allowing greater flexibility of each of the arm units. In turning to FIG. 2, the ability to independently flex the respective arms containing the transmitter assemblies is also enhanced by thinning out at the neck 22 portions of the arms. In this embodiment the ratio of the neck 22 thickness to the extremity thickness at 23 is approximately a ratio of 1 to 2. This overall construction results in optimum flexibility at each of the arm units, allowing each to more readily conform to the body curvature and at the same time introducing hardly any compression upon body 11, to essentially provide no interfering stress on the other transmitting crystals and the receiver crystal. At each of the arm extremities, cavities 20 are provided for housing the transmitting assemblies, e.g., crystal 15 and the lens 18, and simultaneously allowing sufficient room around the lens element to assure sufficient room for an ultrasonic coupling gel to stay in place enhancing the capability for long term monitoring.

It should be noted that the various dimensions between the transmitting and receiving elements is critical to each of the other dimensions. All these dimensions have been developed based on the consideration of utilizing the present transducer assembly for fetal monitoring where an average curvature of the body is about 20 cm. The distance between the center of adjacent transmitter crystals is approximately 8 cm and the distance center to center from each transmitter crystal to the receiver crystal is about 4½ cm.

With regard to the crystal characteristics these are preferably lead-zirconate-titanate which is especially efficient to convert electrical signals to mechanical motion. For the receiving crystal the material used could be quartz or lead-metaniobate which has a high efficiency in converting mechanical motion to electrical signals. Each of the transmitter crystals is cut in the shape illustrated in the dashed lines in FIG. 1, so that the ultrasonic energy is radiated in only selected directions. For example, with reference to FIG. 3, at the cutoff edge 24 of each transmitter lens 15, the ultrasound beam spread radiated from crystal 15 is hardly diverted as the cutoff edge is near the center of the lens.

In the present embodiment, the transmitter crystals are approximately 1.9 cm in diameter whereby the cutoff section would amount to a radial distance of 0.635 cm from the outer edge. This provides for an approximate area for each transmitting crystal of 2 square cm. The receiving crystal area is approximately 3.87 cm square, or, roughly twice that of each of the transmitting crystals. The total area of the transmitting crystals, on the other hand, exceeds the area of the receiving crystal by a ratio of at least 1½ to one. The receiving crystal is made considerably larger than the transmitting crystals as it must detect the ultrasonic energy from a considerably larger area then any one of the transmitting crystal illuminated areas. The lenses 17, 18, 19 for the transmitter crystal and lens 13 for receiver crystal have approximately the same radius of curvature. However, as may be seen with reference to FIG. 3, due to the different size of crystals used, the beam spread covered by receiving crystal is greater. In the present embodiment, the transmitters have approximately an 8° of beam spread while the receiver has approximately 11° of beam spread, or a total beam spread of 16° and 22° respectively.

Figure 3:
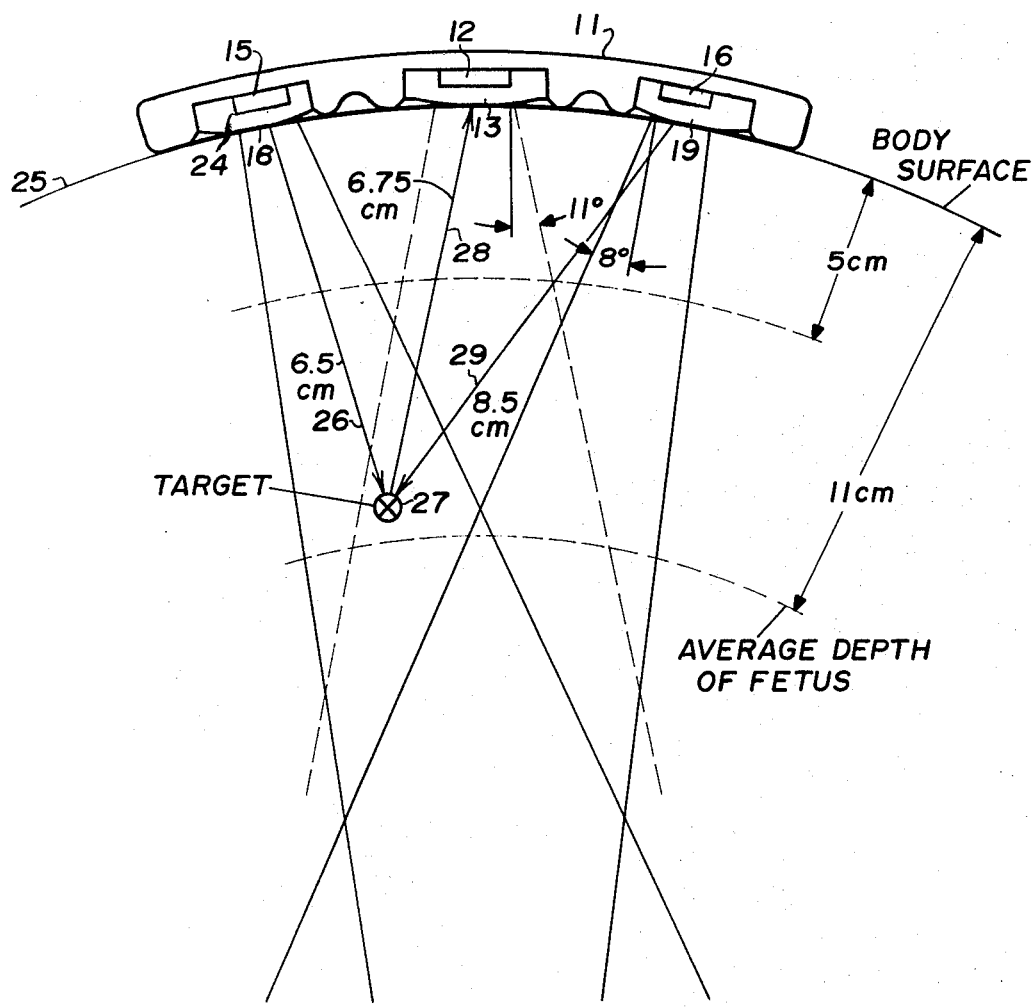
FIG. 3 is a schematic cross-sectional view of the transducer assembly taken across the center two of the extension arms in application to a human subject.

As is partially illustrated in FIG. 3, the three transmitter units are mounted in the transducer assembly in such a manner that the radiating beams overlap each other to uniformly illuminate a large area. The radiated patterns emitted by crystals 15 and 16 actually overlap to a greater extent than that shown as a result of, the side lobes of ultrasonic energy off the crystal edges as well as the scattering effect within the body tissue. In the present embodiment it was found that the transmitter crystals would illuminate roughly 8 cm$^2$ at a depth of 5 cm from the lens whereas the receiving crystal would illuminate roughly 16 cm$^2$.

As is also depicted in FIG. 3, utilization of the multiple element transmitter assembly assures the shortest path of ultrasonic energy between the transmitter, target and receiver. For example, assuming that target 27 is at the point indicated, the transmitter-target-receiver path 26, 27 and 28 is shown to be approximately 13.25 cm whereas the transmitter-target-receiver path 29, 27 and 28 is shown to be 15.25 cm. Assuming use of the conventional single transmitter and receiver assembly at where crystals 16 and 12 are positioned, then the path to be travelled would take an additional 2 cm. which would reduce the amplitude of the signal illuminating the target by approximately 4 db resulting in a lower amplitude signal at the receiver.

It should be understood, of course, that various combinations and permutations of crystal spacing and crystal sizes with lens curvatures might be employed. In the instant embodiment, for example, spacing between the adjacent transmitter crystal centers might be anywhere from 7 to 9 cm and the spacing between each transmitter crystal and receiver crystal might be anywhere between 4 to 5 cm. Should, however, the spacing between transmitters and receiver be increased considerably, then, due to the 20 cm average body curvature, the transmitters might not illuminate beyond the 11 cm depth to result in a shallow area illumination. Thus, a high percentage of fetuses which are often at the 14 cm and 16 cm depths, would be missed altogether. On the other hand, with very close spacing between the transmitters and receiver, the ultrasonic beams radiated would not overlap at 5 cm below the surface of the body and, therefore, fetal movement at this location would provide no monitoring signal.

I claim:

1. An ultrasonic multiple element transducer assembly for use particularly in patient monitoring, comprising:

a. A base of substantially flattened cloverleaf type configuration and homogeneous, flexible material composition, having a center area with at least three arms extending outwardly therefrom, the arrangement of each of said arms being such as to be independently flexible relative to each other and to the center area with each arm having proximate said center area narrower width and thickness dimensions than the outer arm area and said center area, for enabling the assembly to conform to varying body curvatures, said base being constructed so as to virtually eliminate cross-coupling of ultrasonic energy therethrough between the center area and the arms;

b. ultrasonic transmitter means provided proximate the free end of each of said arms, said transmitter means being arranged and including lens means for providing overlapping direct beam illumination of a predetermined volume of the interior of the patient's body intended to be monitored; and c. ultrasonic receiver means provided at said center area and including lens means arranged to provide illumination of a substantially greater percentage of the portion of the patient intended to be monitored than that provided by the said transmitter means associated with any one of said arms, for enabling detection by said receiver means of ultrasonic energy from whichever of said transmitter means associated with any of said arms, for enbody intended to be monitored at any time.

2. The ultrasonic transducer assembly according to claim 1 wherein said arms are substantially equally spaced apart about the center area, with the transmitter means of each of said arms being substantially equally distant from the center area and from each other.

3. The ultrasonic transducer assembly according to claim 2 wherein said cloverleaf base configuration includes a stem portion by way of which a plurality of external conductive coupling elements are introduced into said base to extend therewithin to make electrical contact respectively with said receiver means and said transmitter means.

4. The ultrasonic transducer assembly according to claim 2 wherein each of said transmitter means is predeterminably shaped in relation to the lens means associated therewith for limiting radiation of ultrasonic energy to preselected directions.

5. The ultrasonic transducer assembly according to claim 2 wherein each said transmitter means and associated lens means constitutes a transmitting subassembly, each said transmitting subassembly being mounted in a cavity of correspondingly shape in the arm to which it is associated, said cavity providing around said transmitting subassembly a recess for the deposition of conductive coupling gel, said recess retaining said gel so as to substantiate inhibit dissipation thereof to permit efficient patient monitoring over long periods of time.

6. The ultrasonic transducer assembly according to claim 2 wherein each said transmitter means includes a crystal composed of lead-zirconate-titanate and said receiver means includes a crystal composed material from the group of quartz or lead-metaniobate, the use of said different crystal materials serving to provide highest system sensitivity with minimum input power.

7. The ultrasonic transducer assembly according to claim 2 wherein each of said arms is shaped to have narrower width and thickness proximate the juncture thereof with said center area relative to the free end thereof and also to the center area width and thickness.

8. The ultrasonic transducer assembly according to 2 wherein the distance between the centers of adjacent transmitter means is anywhere from seven to nine centimeters and the distance from the center of the receiver means the center of each transmitter means is anywhere from 4 to 5 centimeters.

9. The ultrasonic transducer assembly according to claim 1 wherein each of said transmitter means and its associated lens means constitutes a transmitting subassembly and said receiver means and its associated lens means constitutes a receiving subassembly, wherein said transmitting and receiving subassemblies are adapted to provide beam overlap and reception of returning ultrasonic energy whether or not said transmitting subassembly and said receiving subassembly are uniplanar in arrangement.

10. The ultrasonic transducer assembly according to claim 9 wherein said transmitting subassemblies are adapted and arranged to provide that ultrasonic energy transmitted therefrom is substantially unfocused at the portion of the patient intended to be monitored regardless of whether the placement of the assembly on the patient yields a substantially uniplaner assembly configuration.

* * * * *

Disclaimer 3,847,016.—*Janis Gunars Ziedonis*, Cranbury, N.J. ULTRASONIC TRANS-
DUCER ASSEMBLY. Patent dated Nov. 12, 1974. Disclaimer filed
Apr. 30, 1975, by the assignee, *Hoffmann-La Roche Inc.*
Hereby enters this disclaimer to claim 7 of said patent.
[*Official Gazette July 22, 1975.*]

UNITED STATES PATENT OFFICE
CERTIFICATE OF CORRECTION

PATENT NO. : 3,847,016
DATED : November 12, 1974
INVENTOR(S) : Janis Gunars Ziedonis It is certified that error appears in the above-identified patent and that said Letters Patent are hereby corrected as shown below:

Claim 1, column 4, line 29, delete "means associated with any of said arms, for en-" and substitute therefor --is illuminating the portion of the patient's--.

Claim 5, column 4, line 53, change "correspondingly" to --corresponding--.

Claim 8, column 5, line 11, after "means" (first occurrence) insert --to--.

Insert in the List of References: "3,561,430  2/1971  Filler,Jr. . . . 128/2.05"

Signed and Sealed this fourteenth Day of October 1975

[SEAL]

Attest:

RUTH C. MASON
Attesting Officer

C. MARSHALL DANN
Commissioner of Patents and Trademarks